United States Patent [19]
Sutton

[11] Patent Number: 5,330,221
[45] Date of Patent: Jul. 19, 1994

[54] BICYCLE WHEELIE BALANCING DEVICE

[76] Inventor: Steven W. Sutton, 369 Doris Dr., Millville, N.J. 08332

[21] Appl. No.: 5,058

[22] Filed: Jan. 15, 1993

[51] Int. Cl.$^5$ .......................... B62H 1/12; B62H 7/00
[52] U.S. Cl. ....................................... 280/293; 280/239
[58] Field of Search ............... 280/239, 293, 292, 295, 280/205

[56] References Cited

U.S. PATENT DOCUMENTS

| | | | |
|---|---|---|---|
| 2,629,611 | 2/1953 | Covington | 280/292 |
| 3,321,047 | 5/1967 | Ryan et al. | 188/24 |
| 3,437,351 | 4/1969 | St. Clair Newbern | 280/205 |
| 4,012,054 | 3/1977 | Moore | 280/239 |
| 4,154,452 | 5/1979 | Newman | 280/293 |
| 4,353,571 | 10/1982 | Anderson | 280/295 |
| 4,772,037 | 9/1988 | Jones | 280/293 |
| 4,886,294 | 12/1989 | Nahachewski | 280/755 |

FOREIGN PATENT DOCUMENTS

| | | |
|---|---|---|
| 727776 | 4/1932 | France . |
| 895316 | 4/1944 | France . |
| 8908043 | 9/1989 | PCT Int'l Appl. .................. 280/239 |

*Primary Examiner*—Mitchell J. Hill
*Attorney, Agent, or Firm*—Thomas A. Lennox

[57] ABSTRACT

An auxiliary device attachable to a bicycle to aid in learning the stunt known as "popping wheelies" balance on the rear wheel of the bicycle, the device including a rearwardly extending support frame, a rear frame pivotally attached at one end to the support frame and pivotally attached at the other end to a member that is lengthwise adjustably attached to the support frame with a pair of wheels on an axle flexibly attached to the rear frame.

13 Claims, 3 Drawing Sheets

5,330,221

BICYCLE WHEELIE BALANCING DEVICE

BACKGROUND OF THE INVENTION

This invention involves an auxiliary device to aid in the training of doing wheelies on a bicycle.

One of the common stunts learned by skilled bicycle riders is the trick of doing "wheelies" wherein the rider balances the bike on the rear wheel raising the front wheel off the ground while moving. With increasing attention to bicycle safety, a variety of devices have been provided directed to preventing the person from going too far and tipping over backwards or in some cases aiding in learning how to accomplish the feat of doing wheelies. These devices are described in the following U.S. Pat. Nos.: 2,629,611 to Covington, 3,321,047 to Ryan et al, 3,437,351 to Newbern, 4,012,054 to Anderson, 4,772,037 to Jones, and 4,886,294 to Nachachewski. Most of these devices include a single wheel or a drag member to prevent the bike from going too far when the rider is attempting "popping wheelies". While these devices are satisfactory to varying degrees, none allow the rider to effectively balance the bike in a "wheelie" position and also maneuver the bike effectively. None of these devices provide that balance of maneuverability and safety sufficient to encourage a person to attempt and develop the skills necessary to execute the stunt.

SUMMARY OF THE INVENTION

It is an object of the present invention to provide an auxiliary device attachable to a wide variety of bicycle styles to aid in learning the stunt known as "popping wheelies".

It is a further object of the present invention to provide a device that allows a rider of a bicycle to balance on the rear wheel as well as two wheels of the device and have the capability of maneuvering the bicycle to avoid collisions.

It is an additional object of the present invention to provide a device that is not only sturdy but also adjustable to allow placing the center of gravity when the rider is balancing on the rear wheel and the device well behind the rear axle of the bicycle.

It is a particular object of the present invention to provide a device that greatly aids in preventing the rider from going too far and losing balance during the learning process to perform the stunt.

It is a further object of the present invention to provide a device attached to a bicycle that allows a person to balance backwardly on the rear wheel and the device and easily rock forward to a normal riding position.

It is an additional object of the present invention to provide a streamlined device that does not get in the way when mounting or dismounting the bicycle and does not pose a hazard of hanging up on objects the bicycle is passing.

It is a further object of the present invention to provide a device which will not only aid an experienced bicycle rider to develop the skill to pop wheelies, but also can be used as a training device to aid beginners who are learning to ride a bicycle for the first time.

An aspect of the invention is an auxiliary device attachable to a bicycle having a base frame supporting a seat, a rear wheel rotating on a rear axle and forwardly extending frame members forming a rear wheel axle support frame on each side of the rear wheel. The device includes a rearwardly extending rigid support frame that includes a rearward section. This rigid support frame includes a pair of members with forward ends attachable to the rear wheel axle support frame. The rigid support frame further includes a pair of angled members rigidly attached to and angling forwardly and upwardly from the rearward section and including forward ends attachable to the base frame. The device further includes a rear member that includes a rearward end and a forward end pivotally attached at the forward end to the rearward section of the rigid support frame. The device further includes an adjustment and support member that includes a forward section and a rearward end pivotally attached at end rearward end to the rearward end of the rear member. The device also includes attachment means to lengthwise selectively attach a forward section of the adjustment and support member to the angled members of the rearwardly extending rigid support frame. The device further includes and axle member having ends and a pair of wheels rotatably affixed on the ends of the axle member, each wheel including an outside vertical edge, said edges being distanced from each other about four to about ten inches. The device also includes axle attachment means to structurally attach the axle member to the rear member in parallel alignment with the rear axle of the bicycle, and to allow lengthwise flexure between the axle and the rear member.

It is preferred that the outside edges of the wheels be about eight inches apart. It is further preferred that the attachment means to lengthwise selectively attach the forward section of the adjustment and support member be of an adjustable length to position the center of gravity of the bicycle, when it is balanced on its rear wheel and the pair of wheels of the device, at least one half the distance rearwardly from the rear axle of the bicycle to the axle member of the device. It is also preferred that the diameter of the wheels be about one to about six inches, and more preferably that the diameter of the wheels be about two inches. It is further preferred that the device further include a bracket member to which the axle member is attached by the axle attachment means and that device also includes bracket attachment means to adjustably attach the bracket member to the rear member, the bracket attachment means allowing fine adjustment of the alignment of the axle member. It is also preferred that the bracket attachment means include a plurality of holes through the rear member, a plurality of aligned holes through the bracket member, and a plurality of bolts interfitting through the aligned holes, wherein there is sufficient play between the size of the holes and the size of the bolts to allow the fine adjustment of the alignment of the axle member. It is further preferred that the axle attachment means allow lengthwise rocking both horizontally and vertically. It is also preferred that the axle attachment means includes at least one annular ring of compressible resilient material with a bolt extending through a center opening pulling a washer against the ring to adjustably compress the ring.

Another aspect of the invention is an auxiliary device attachable to a bicycle as above. The device includes a rearwardly extending rigid support frame as above. The device further includes a rear member pivotally attached as above, an adjustment and support member pivotally attached as above, and attachment means as above. The device further includes a pair of wheels each having a diameter of about two inches rotatably affixed on ends of an axle member, each wheel comprising an outside vertical edge, said edges being distanced from each other about six inches. The device further includes axle attachment means to structurally attach the axle member-to the rear member in parallel alignment with the rear axle of the bicycle, and to allow horizontal and vertical lengthwise rocking of the axle member.

DESCRIPTION OF PREFERRED EMBODIMENTS

Figure 1:
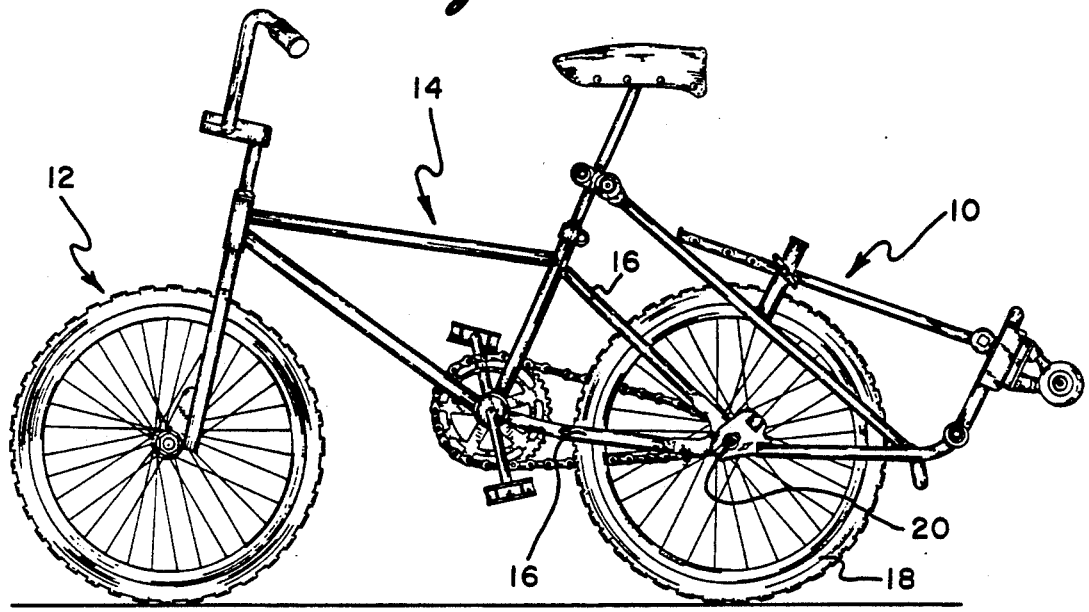
FIG. 1 is a left side elevational view of a bicycle to which a device of the present invention is attached.
Figure 2:
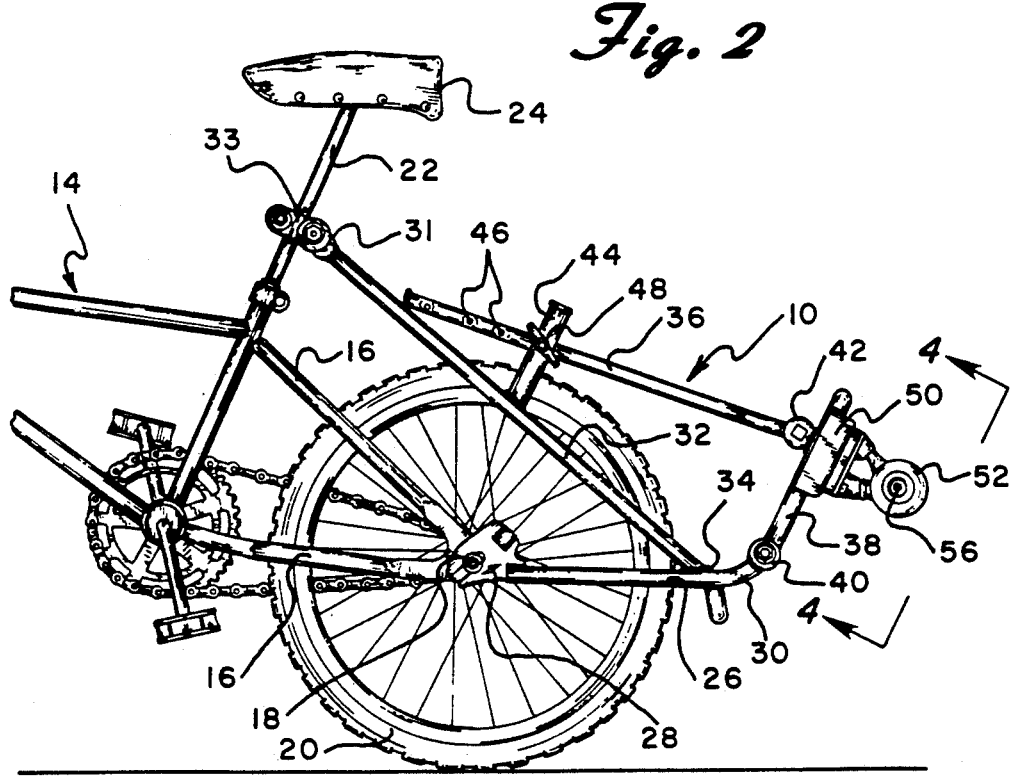
FIG. 2 is an enlarged view of FIG. 1 with the front portions of the bicycle cut away.
Figure 3:
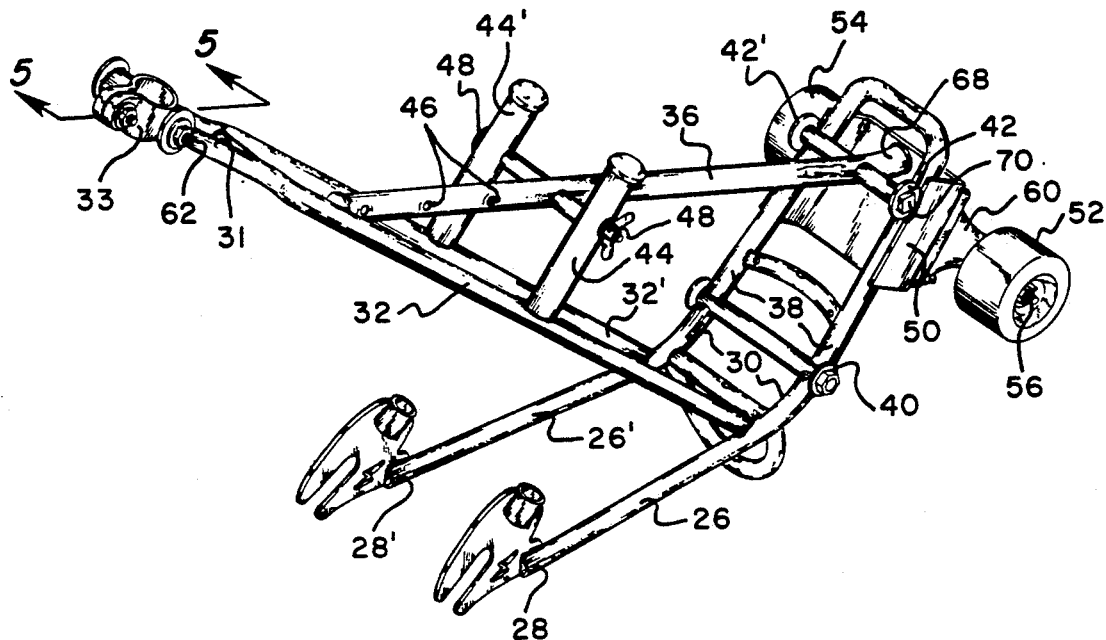
FIG. 3 is a top, frontal and left side perspective view of the device illustrated in FIG. 1 disconnected from the bicycle.
Figure 4:
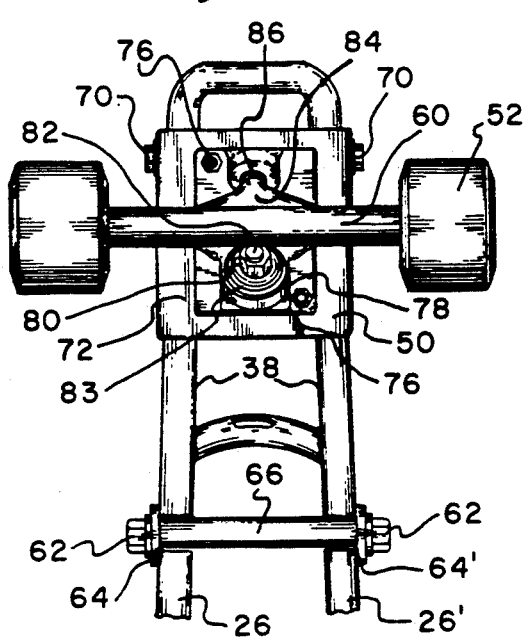
FIG. 4 is a rear view taken from line 4—4 of FIG. 2 with the bicycle and front of device cut away.
Figure 5:
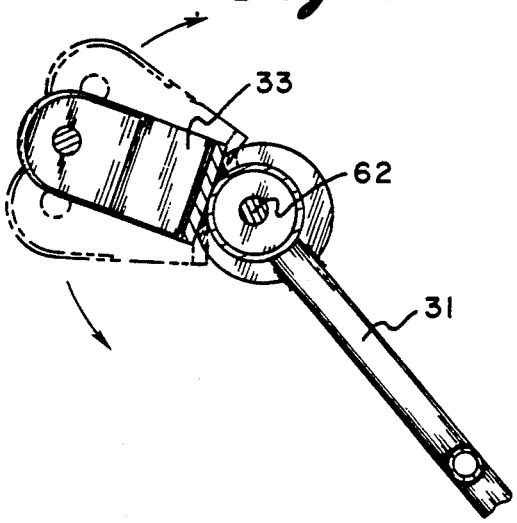
FIG. 5 is a partial cross-sectional side cut away view a portion of the device.

In the figures, device 10 is an embodiment of the present invention attached on bicycle 12, which is of standard construction with frame 14 with forwardly extending frame members 16 extending on both sides of rear wheel 20 providing rear wheel axle support for rear axle 18. Vertical seat support member 22 is height adjustably connected to frame 14 to support seat 24. Device 12 is constructed of tubular steel members attached, where not noted, by standard welding techniques used in the construction of bicycle frames. Device 10 includes a rigid support frame, generally constructed in a "V" shape attached at each end to the bicycle frame forming an integral rigid support frame. The support frame extends rearwardly from the rear wheel axle 18 of the bicycle and includes horizontal frame members 26 and 26' connected at forward ends 28 and 28' to the bicycle frame at the rear wheel axle, Angled frame members 32 and 32' extend upwardly from horizontal member's 26 and 26' at about a forty degree angle in a forward direction attaching at forward ends 31 to vertical seat support member 22 of the bicycle frame. Attachment of ends 31 to member 22 as shown in FIG. 5 is a pivot connection with bracket 33 tightening around member 22 at a height adjustable to compensate for the differences in sizes and shapes of bicycle frames. Although the connection of end 31 to member 22 is adjustable pivotally, it is tightenable by bolt and nut combination 62 at a chosen angle to structurally fix the rigid support frame as an integral unit of members 26, 26',32 and 32' with the bicycle frame. At the rearward section of the rigid support frame, rearward sections of frame members 26, 26', 32 and 32' are connected through weld connections 34 to make the frame into an integral unit. As shown in FIG. 3, rear member 38 is a rectangular shaped tubular frame member, but may be a plate or other structure to provide support and connection to wheels 52 and 54. Rear frame member 38 is pivotally attached at pivot connection 40 to rearward section 30 of the frame members. Steel washers 64 and 64' are welded to rearward ends of members 26 and 26' respectively to receive bolt and nut combination 62 that extends inside the length of tubular cross front end member of frame 38. Adjustment and support member 36 is a tubular steel member pivotally attached at its rearward end by a pivot connection to a generally rearward position of rear frame member 38. At end 68 of member 36 a horizontal hole is provided through which bolt and nut combination 70 extend from washers 42 and 42' welded and extending upwardly from side members of rear frame member 38. Attachment of axle 60 is similar to that used on skate boards providing for flexible rocking of the axle both vertically and horizontally limited and adjustable to the degree of flexibility. This is accomplished for providing annular ring 78 as an integral part of the axle extending around threaded post 82 extending upwardly from plate shaped bracket member 74. A washer is held in place by nut 80 engaging resilient washer 83 engaging the top surface and extending through the opening of annular ring 78. Tightening knob bolt of nut 80, reduces the movement of axle 60. Post 84 extends from axle 60 into resilient seat 86, which allows restrained movement and provides support for the axle.

Figure 7:
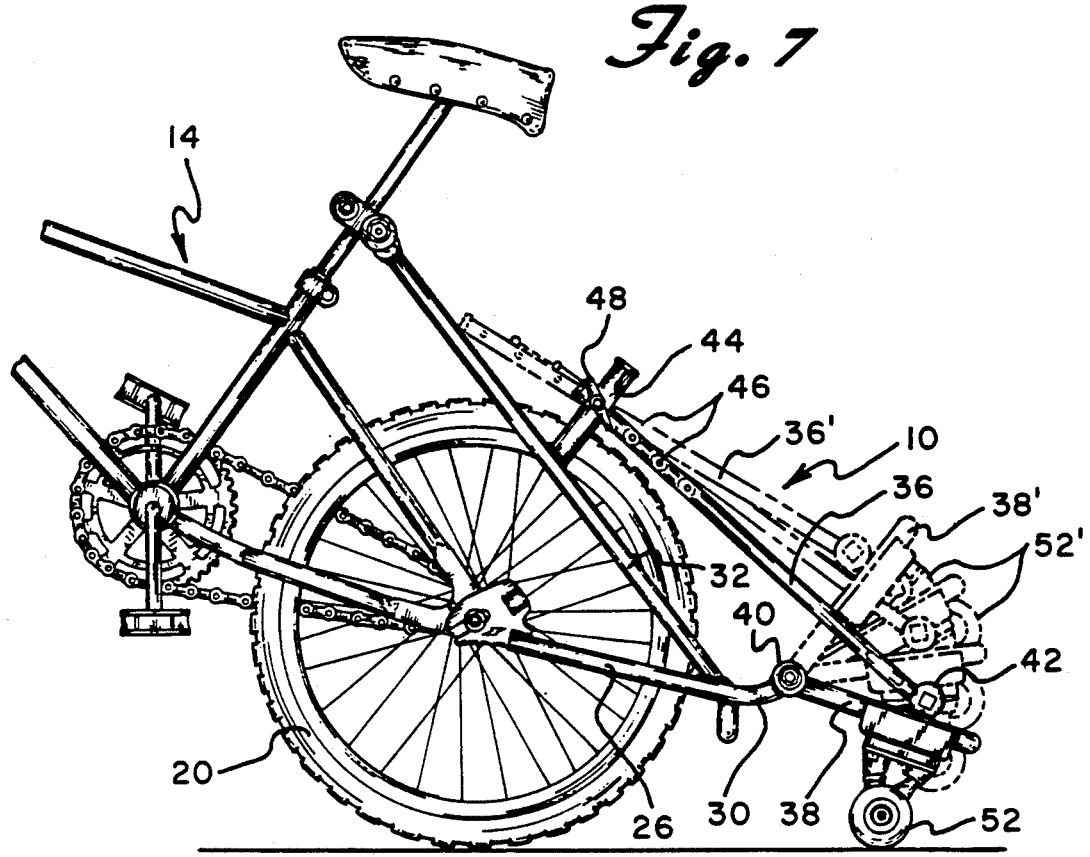
FIG. 7 is a side elevational view similar to that of FIG. 2 with the device adjustability displayed.
Figure 6:
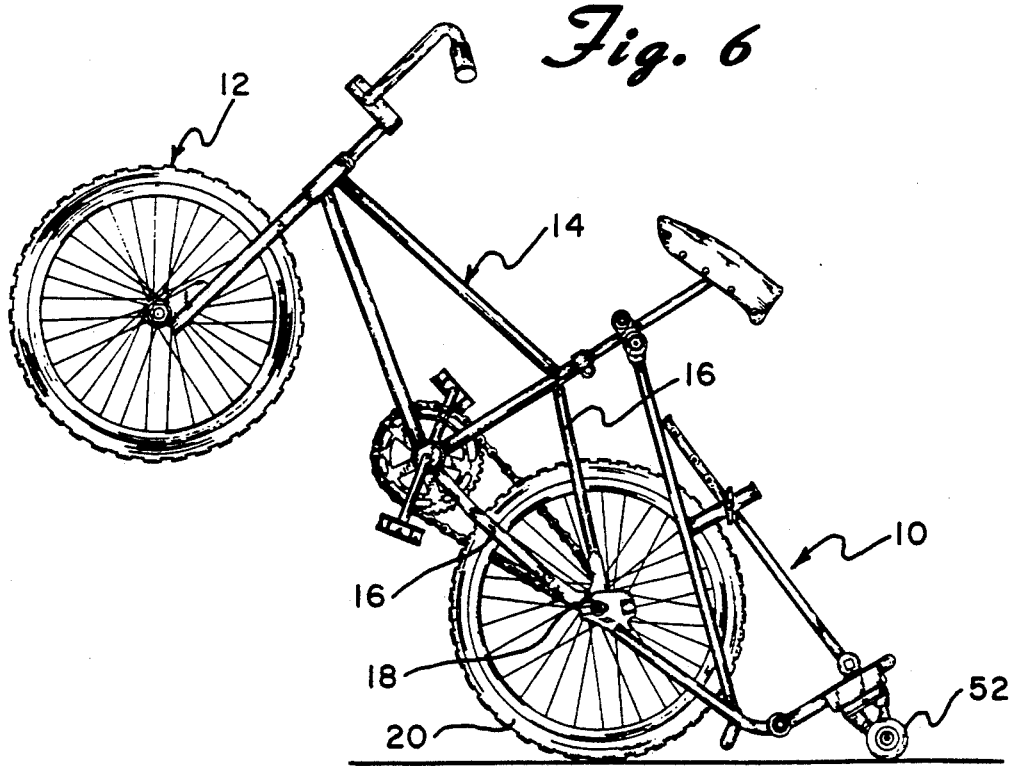
FIG. 6 is a side elevational view of the bicycle with the device as shown in FIG. 1 balanced on the rear wheel and the device.

As shown in FIG. 6, bicycle 12 is in a position ridden balanced on wheel 20 and wheels 52 and 54 of device 10. In the enlarged partially cut away view of FIG. 7, adjustment of arm 36 lengthwise allows wheels 52 and 54 to be adjusted at various positions, indicated by shadow views 52' as the position of rear frame member 38 is pivoted at pivot connection 40 and on washers 42 and 42', the position depending upon which of holes 46 is chosen along the length of member 36 held in position by wing nut and bolt combination 48 through vertical holes through support members 44 and 44'. Until member 36 is fixed in position, rear member 38 is free to pivot into any desired position and angle with respect to the road, thereby positioning wheels 52 and 54 at adjustable positions chosen to control the angle of the bicycle during the wheelie operation of the bicycle. Vertical support members 44 and 44' are welded at bottom ends to a median position on angled frame members 32 and 32' extending upwardly to provide an adjustable connection with member 36. Holes 46 spaced along the length of member 36 allow lengthwise adjustable insertion of wing nut and bolt combination 48 extending through horizontal holes in members 44 and 44'. Thus, the length of member 36 is adjustable and with that adjustment allows the angle of rear member 38 to be fixed in at any chosen angle to position wheels 52 and 54. Attachment "U" shaped bracket 50 is welded to rear member 38 placing surface 72 facing generally rearwardly and downwardly through oversized holes in bracket 50 allowing fine tune adjustment of the angle of axle 60 on which wheels 52 and 54 rotate to allow for alignment with the lengthwise alignment of the bicycle. Plate shaped bracket member 74 of the wheel mechanism is attached through bolt and nut combinations 76.

The outside edges of wheels 52 and 54 are about eight and one-half inches apart and each wheel is about an inch and a half wide. This distance provides an excellent degree of balance without materially getting in the way of passing objects or the rider's feet when getting on and off the bicycle. As the distance between the outside edges of the wheels are increased to about twelve inches, steering and maneuvering the bike in a wheelie position is materially decreased. Further, the wheels extending outwardly to the side of the bicycle pose increased risk of engaging a passing object. As the outside edges of the wheels are reduced to about five inches, the aid in balancing doing the wheelies is materially reduced and it is difficult to maintain a wheelie position through a protected series of maneuvers steering the bicycle while in that position. The diameter of the wheels are about two to two and one-half inches, standard for skateboard wheels. Increasing the diameter of the wheels above about four inches causes them to be materially in the way when getting on and off the bicycle and severely reduces the streamlined appearance of the device. Reducing the diameter of the wheels to about one inch seriously detracts from the ride of the device when in a wheelie position, making it difficult to maneuver and causing minor road imperfections to unduly effect the balance of the bicycle. It is preferred that the wheel diameter be in the range of about one inch to about six inches and more preferably be in the range of about two inches to three inches. It is preferred that the outside edges of the wheels be about five inches to about twelve inches apart and more preferably in the range of about six to ten inches apart.

While this invention has been described with reference to the specific embodiments disclosed herein, it is not confined to the details set forth and the patent is intended to include modifications and changes which may come within and extend from the following claims.

I claim:

1. An auxiliary device attachable to a bicycle having a base frame supporting a seat, a rear wheel rotating on a rear axle and forwardly extending frame members forming a rear wheel axle support frame on each side of the rear wheel, the device comprising:
   (a) a rearwardly extending rigid support frame comprising:
      (i) a rearward section,
      (ii) a pair of members comprising forward ends attachable to the rear wheel axle support frame, and
      (iii) a pair of angled members rigidly attached to and angling forwardly and upwardly from the rearward section and comprising forward ends attachable to the base frame,
   (b) a rear member comprising a rearward end and a forward end pivotally attached at the forward end to the rearward section of the rigid support frame,
   (c) an adjustment and support member comprising a forward section and rearward end pivotally attached at the rearward end to the rearward end of the rear member,
   (d) attachment mans to lengthwise selectively attach the forward section of the adjustment and support member to the angled members of the rearwardly extending rigid support frame,
   (e) an axle member having ends,
   (f) a pair of wheels rotatably affixed on the ends of the axle member, each wheel comprising an outside vertical edge, said edges being distanced from each other about four to about ten inches, and
   (g) axle attachment means:
      (i) to structurally attach the axle member to the rear member in parallel alignment with the rear axle of the bicycle, and
      (ii) to allow lengthwise flexure movement between the axle and the rear member.

2. The device of claim 1 wherein the outside edges of the wheels are about six inches apart.

3. The device of claim 1 wherein the attachment means to lengthwise selectively attach the forward section of the adjustment and support member is of an adjustable length to position the center of gravity of the bicycle, when it is balanced on its rear wheel and the pair of wheels of the device, at least one half the distance rearwardly from the rear axle of the bicycle to the axle member of the device.

4. The device of claim 1 wherein the diameter of the wheels are about one to about six inches.

5. The device of claim 4 wherein the diameter of the wheels are about two inches.

6. The device of claim 1 further comprising:
   (a) a bracket member to which the axle member is attached by the axle attachment means, and
   (b) bracket attachment means to adjustably attach the bracket member to the rear member, the bracket attachment means allowing fine adjustment of the alignment of the axle member.

7. The device of claim 6 wherein the bracket attachment means comprises a plurality of holes through the rear member, a plurality of aligned holes through the bracket member, and a plurality of bolts interfitting through the aligned holes, wherein there is sufficient play between the size of the holes and the size of the bolts to allow the fine adjustment of the alignment of the axle member.

8. The device of claim 1 wherein the axle attachment means allows lengthwise rocking both horizontally and vertically.

9. The device of claim 1 wherein the axle attachment means comprises at least one annular ring of compressible resilient material with a bolt extending through a center opening pulling a washer against the ring to adjustably compress the ring.

10. An auxiliary device attachable to a bicycle having a base frame supporting a seat, a rear wheel rotating on a rear axle and forwardly extending frame members forming a rear wheel axle support frame on each side of the rear wheel, the device comprising:
   (a) a rearwardly extending rigid support frame comprising:
      (i) a rearward section,
      (ii) a pair of members comprising forward ends attachable to the rear wheel axle support frame, and
      (iii) a pair of angles members rigidly attached to and angling forwardly and upwardly from the rearward section and comprising forward ends attachable to the base frame,
   (b) a rear member comprising a rearward end and a forward end pivotally attached at the forward end to the rearward section of the rigid support frame,
   (c) an adjustment and support member comprising a forward section and a rearward end pivotally attached at the rearward end to the rearward end of the rear member,
   (d) attachment means to lengthwise selectively attach the forward section of the adjustment and support member to the angled members of the rearwardly extending rigid support frame,
   (e) an axle member having ends,
   (f) a pair of wheels each having a diameter of about two inches rotatably affixed on the ends of the axle member, each wheel comprising an outside vertical edge, said edges being distanced from each other about six inches, and
   (f) axle attachment means:

(i) to structurally attach the axle member to the rear member in parallel alignment with the rear axle of the bicycle, and (ii) to allow horizontal and vertical lengthwise rocking of the axle member.

11. The device of claim 10 wherein the attachment means to lengthwise selectively attach the forward section of the adjustment and support member is of an adjustable length to position the center of gravity of the bicycle, when it is balanced on its rear wheel and the pair of wheels of the device, at least oen half the distance rearwardly from the rear axle of the bicycle to the axle member of the device.

12. The device of claim 10 further comprising:

(a) a bracket member to which the axle member is attached by the axle attachment means, and (b) bracket attachment means to adjustably attach the bracket member to the rear member, the bracket attachment means allowing fine adjustment of the alignment of the axle member.

13. The device of claim 12 wherein the bracket attachment means comprises a plurality of holes through the rear member, a plurality of aligned holes through the bracket member, and a plurality of bolts interfitting through the aligned holes, wherein there is sufficient play between the size of the holes and the size of the bolts to allow the fine adjustment of the alignment of the axle member.

* * * * *